April 30, 1957   A. L. JONES   2,790,660
SPACERS FOR THERMAL DIFFUSION APPARATUS
Filed Sept. 14, 1953
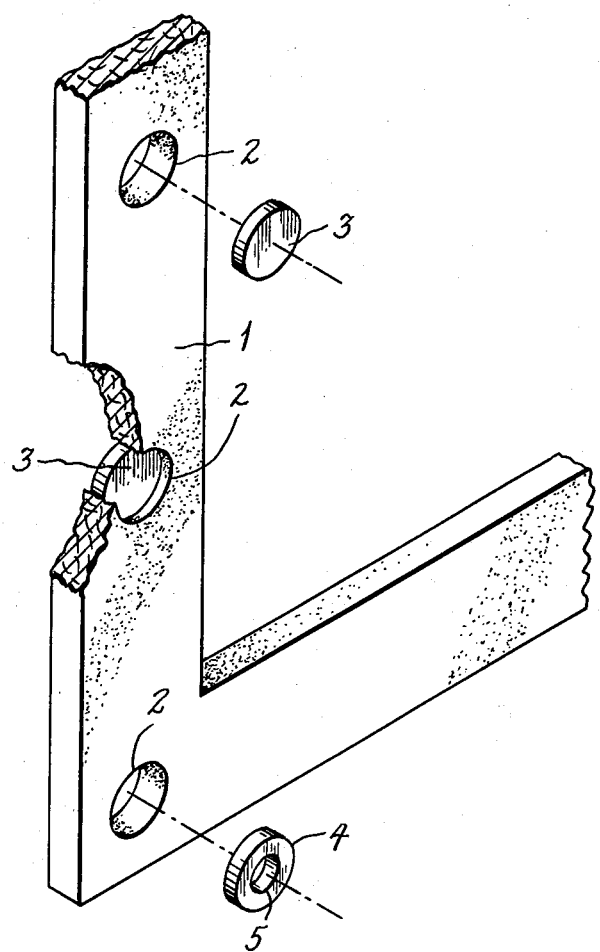
INVENTOR.
ARTHUR LETCHER JONES
BY
Campbell, Brumbaugh, Free & Graves
ATTORNEYS

2,790,660

SPACERS FOR THERMAL DIFFUSION APPARATUS

Arthur Letcher Jones, Lyndhurst, Ohio, assignor to The Standard Oil Company, Cleveland, Ohio, a corporation of Ohio Application September 14, 1953, Serial No. 379,974

2 Claims. (Cl. 288—20)

The present invention relates to gaskets, and, more particularly, to novel and improved apparatus for maintaining the effective thickness of a gasket at a constant value.

It has been found that when gaskets are used as a sealing means between two parallel plates having a critical spacing or separation therebetween, for example, the two parallel plates of a thermal diffusion unit, the resiliency and shape of the gasket changes with time. This change in the resiliency and shape of the gasket, which is characteristic of known gasket materials, results in a variation in the relative spacing or separation between the two spaced apart plates and, in the case of thermal diffusion units, produces a marked change in the operating results obtained by the units.

It is an object of the invention, accordingly, to provide novel and improved apparatus for overcoming the aforementioned disadvantage.

In accordance with the invention, inserts or members composed of non-compressible material are inserted into a gasket. These inserts serve to limit the compression of the gasket and to maintain the gasket at a constant thickness.

A more complete understanding of the invention may be had by reference to the following detailed description taken in conjunction with the accompanying single figure of the drawing, which shows a perspective view of a gasket member, partially broken away and partially exploded to show the placement of a non-compressible member therein in accordance with the invention.

The gasket member 1 of the drawing may take any conventional form suitable for use in the particular apparatus for which it is designed and may be composed of any type of conventional gasket material. The gasket 1 has a plurality of holes or apertures 2 cut therein. The holes 2 are spaced apart, at suitable intervals, along a longitudinal extension of the gasket 1 as shown in the drawing.

The holes 2 are adapted to receive small members or inserts 3 of relatively non-compressible material, having a thickness less than the uncompressed thickness of the gasket 1 and equal to the desired limit of compression of the gasket. The other dimension of the non-compressible members 3 preferably correspond to the dfimensions of the hole or aperture 2.

The non-compressible members may have any suitable form, for example, the flat disc shape of the members 3 or that of the annular washer like member 4, having an aperture 5 therein which may be adapted to receive a bolt or similar rod-like member.

Upon assembly of the gasket 1 including the non-compressible members 3 or 4, it will be apparent that when the gasket 1 is positioned between two parallel plates, for example, the parallel plates of a thermal diffusion unit, the gasket 1 can be compressed until the non-compressible members 3 or 4 restrain the further compression of the gasket.

Thus, there has been provided a novel and improved apparatus for enabling a gasket member to be compressed between two parallel surfaces to establish a critical spacing or separation during an assembly operation and to maintain that critical spacing or separation substantially constant.

It will be obvious to one skilled in the art that the above-disclosed exemplary embodiment is susceptible of modification and variation without departing from the spirit and scope of the invention. For example, instead of inserting non-compressible members in holes passing completely through the gasket member, recesses of any suitable configuration may be utilized to receive the non-compressible members. Further, the non-compressible members are not limited to disc or washer-like shapes as disclosed, but may take any suitable form such as an elongated flat strip running longitudinally with the gasket member and recessed therein. Therefore, it will be apparent that the invention is not deemed to be limited except as defined in the appended claims.

I claim:

1. In a gasket having substantially parallel lateral faces of greater width than the thickness of the gasket adapted to be compressed between and contact surfaces of opposing members intended to be separated by said gasket and spaced apart a critical distance, the improvement comprising a plurality of apertures spaced apart along said gasket and disposed wholly within the areas of said lateral faces, and having walls substantially perpendicular to said faces, and a plurality of relatively non-compressible members each having a thickness substantially less than the thickness of said gasket between said lateral faces and equal to said critical distance and having shapes corresponding substantially to the shapes of the corresponding apertures, the non-compressible members fitting closely in said apertures and being retained by the walls of said apertures.

2. In the improvement as claimed in claim 1, at least one of said plurality of relatively non-compressible members having an aperture therein.

References Cited in the file of this patent

UNITED STATES PATENTS

| | | |
|---|---|---|
| 494,402 | Walsh | Mar. 28, 1893 |
| 1,932,039 | Hewitt | Oct. 24, 1933 |
| 2,191,044 | Seligman | Feb. 20, 1940 |
| 2,455,982 | Dawty | Dec. 14, 1948 |
| 2,532,891 | Chupp | Dec. 5, 1950 |
| 2,639,174 | Farnam et al. | May 19, 1953 |
| 2,739,001 | Chiles | Mar. 20, 1956 |